United States Patent [19]

Batchelder

[11] Patent Number: 5,061,428
[45] Date of Patent: Oct. 29, 1991

[54] METHOD FOR PLASTIC COATING FOAM MOLDING INSERT

[75] Inventor: Bruce A. Batchelder, Barrington, N.H.

[73] Assignee: Davidson Textron Inc., Dover, N.H.

[21] Appl. No.: 460,993

[22] Filed: Jan. 4, 1990

[51] Int. Cl.⁵ .............................................. B29C 41/00
[52] U.S. Cl. .................................. 264/251; 264/259; 264/261; 264/262; 264/279; 156/245
[58] Field of Search ............... 264/251, 250, 261, 262, 264/273, 279, 259, 36, 46.4, 245, 252, 253; 156/245, 252, 253, 94

[56] References Cited

U.S. PATENT DOCUMENTS

| | | | |
|---|---|---|---|
| 3,816,580 | 6/1974 | Valyi | 264/250 X |
| 4,375,445 | 3/1983 | Cole et al. | 264/250 |
| 4,473,423 | 9/1984 | Kolff | 264/250 X |
| 4,587,153 | 5/1986 | Sella | 427/272 X |
| 4,610,835 | 9/1986 | Ghavamikia | 264/250 |
| 4,675,061 | 6/1987 | Mead | 156/245 X |
| 4,678,531 | 7/1987 | Metzger et al. | 156/252 X |
| 4,710,250 | 12/1987 | Kojima et al. | 156/252 X |
| 4,818,211 | 4/1989 | Weidman et al. | 264/250 X |
| 4,913,786 | 4/1990 | Horiki et al. | 427/272 |

*Primary Examiner*—David A. Simmons
*Assistant Examiner*—J. Sells
*Attorney, Agent, or Firm*—John C. Evans

[57] ABSTRACT

A method for forming a plastic coating for a foam molding insert or retainer member includes the steps of preforming an insert member having openings therethrough; partially sealing the openings and/or the perimeter edge of the insert member with protuberances formed on a conforming buck; completely sealing the openings and/or the perimeter edge by spraying polymeric material against the insert and the protuberances only in the vicinity of the hole and the perimeter edge to form seals without covering the insert with a film wrap; curing the seals to provide a leak proof patch which prevents foam leakage through the insert during a foam molding process.

4 Claims, 2 Drawing Sheets

PREFORM INSERT WITH HOLES

↓

CONFORM PREFORMED INSERT TO BUCK

↓

PARTIALLY SEAL INSERT HOLES/EDGES WITH BUCKS PROTRUBERANCES

↓

DEPOSIT POLYMERIC SEAL PATCHES OVER HOLES/EDGES

↓

CURE SEAL PATCHES & REMOVE INSERT WITH PATCHES FROM BUCK

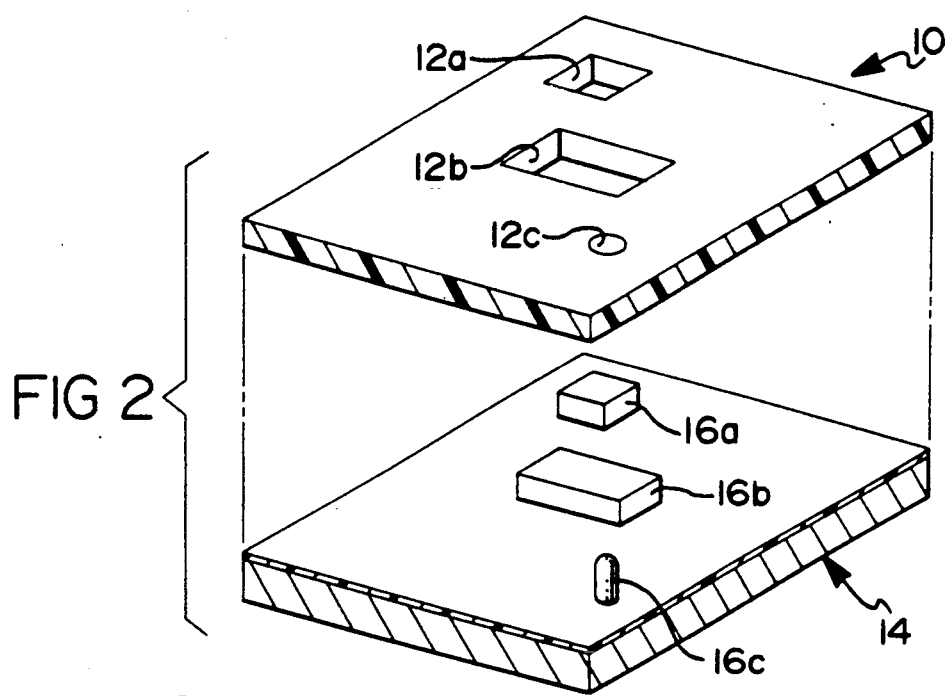
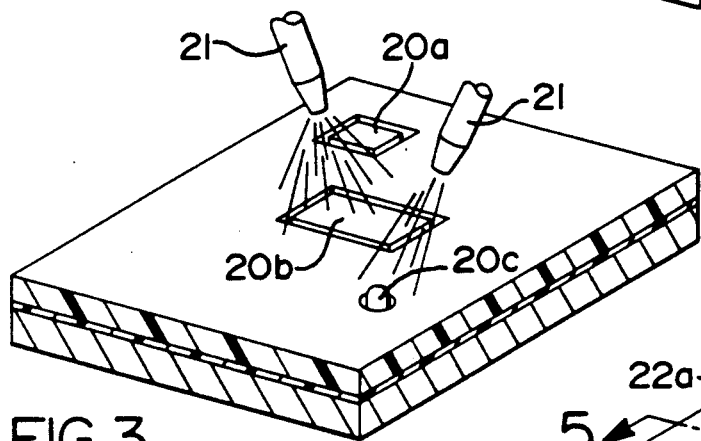
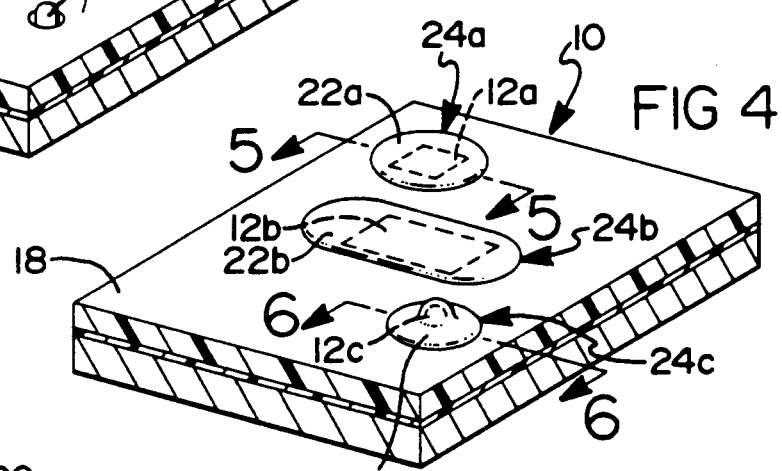
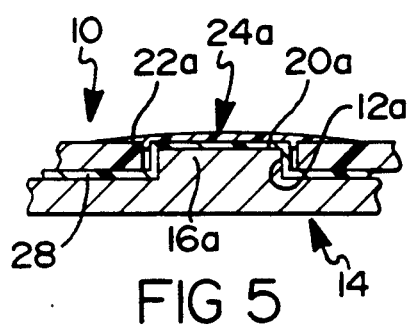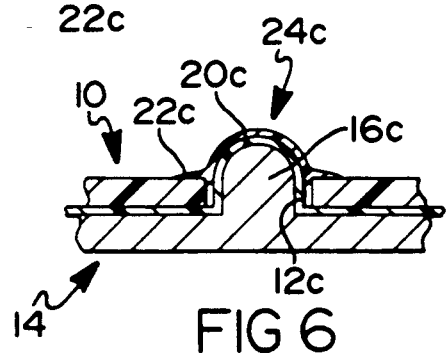

METHOD FOR PLASTIC COATING FOAM MOLDING INSERT

FIELD OF THE INVENTION

This invention relates to molded plastic products and more particularly to a method for manufacturing an insert or retainer member having functional openings therethrough including the steps of forming a cured seal patch on one side of the insert member to prevent the escape of material through the insert holes during formation of a layer of polyurethane foam thereon.

In the past it has been recognized that it is desirable to completely cover an insert or retainer member for use in a composite plastic product with a film to prevent the escape of material through the insert during a foaming process in which polyurethane material is foamed against the insert.

One such method is set forth in U.S. Pat. No. 4,228,115 issued Oct. 14, 1980 to Gardner for Method of Making a Horn Pad. In this method a horn switch assembly is covered by a plastic film and then the assembly is foamed to form a plastic product with an insert member, a covering film and a layer of urethane foam. While suitable for its intended purpose, the method of the '115 patent requires that the insert member be completely wrapped.

U.S. Pat. Nos. 4,420,447 and 4,477,504 disclose instrument panel constructions and methods for foaming material with respect to a load support insert which is completely covered by a film to prevent the escape of foam through operative openings in the insert member.

U.S. Pat. No. 4,806,094 discloses a method for forming a thin polymer skin on an insert for sealing openings therein in which the insert is formed by injection molding material onto a film layer in a mold half; injection mold tools have extensions thereon that form the holes through the insert which are concurrently sealed by the layer of film which is formed across the full surface of the insert.

While the aforesaid methods for covering a load insert plate with a film to prevent the escape of foam through openings in the insert plate, each of the methods require that the film for sealing the insert be configured to drape over the full surface area of the insert.

SUMMARY OF THE INVENTION

An object of the present invention is to provide a film sealed insert member which minimizes the amount of film material required to seal the insert member against foam leakage therethrough.

Another object of the present invention is to provide a method for sealing holes or perimeter edges of an insert member so as to eliminate the need to completely cover the insert member with a film drape.

Still another object is to prevent delamination between a film drape which completely covers an insert in bonded relationship therewith by providing a process which spray forms seal patches only at holes or perimeter edges of an insert member.

A further object of the present invention is to provide an improved method for the manufacture of plastic products having a structural load supporting insert member or retainer member with openings therethrough which method includes the steps of sealing the insert holes by providing a seal patch thereon which is limited only to the region of the holes through the insert. One feature of the preceding object is to locate the insert member on a conforming buck having protuberances that partially seal the openings in the insert and thereafter completely sealing the openings by spraying a film of polymeric material only at the hole to form a seal patch which covers the hole at the protuberance and thereafter curing the seal patch and removing the insert with seal patches thereon from the conforming buck.

Yet another object of the present invention is to provide an improved method for manufacturing interior trim parts for automobiles in which an insert member or retainer member is formed of either metal or plastic having openings therethrough and wherein a seal film is formed on one side of the insert only at the openings therethrough to close the openings against leakage of foam material when the insert is placed in a foam molding apparatus and foam material is directed therein to bond the insert with respect to a thin skin outer shell component.

Yet another object of the present invention is to provide an improved method for manufacturing an insert member or retainer member for use in a foam molding process in which the insert member is a structural component in a composite product and is bonded to foam material reacted thereagainst; the method characterized by locating the insert with holes thereon against a conforming buck having protuberances for partially sealing the holes; completely sealing the holes by sprayinq a patch of polymeric material against one side of the insert only at the holes thereon to form a seal patch only at the holes which is shaped by the protuberance on one side thereof and by the insert at the periphery thereof; curing the skin patch and thereafter removing the insert and skin patches from the conforming buck for subsequent use in the manufacture of a composite product having foam material reacted against and bonded to the insert and wherein the skin patches prevent the escape of urethane foam through the insert during the foam molding process.

The objects are achieved in one process which includes the steps of (a) preforming an insert having a plurality of openings therethrough; (b) partially sealing the insert and the openings thereon by locating the insert against a conforming buck having protuberances thereon located in each of the holes for filling substantially all of the holes through the insert; (c) completely sealing the holes by spraying a film of polymeric material against one surface of the insert only at the holes therein and on the ends of the protuberances to form a seal patch covering the holes and a peripheral segment of the insert only around the holes.

These and other objects of the invention will be more apparent when taken in conjunction with the following detailed description of the invention along with reference to the accompanying drawings wherein:

BRIEF DESCRIPTION OF THE DRAWINGS

FIG. 2 is an exploded perspective view showing a preformed insert member in association with a conforming buck for partially sealing openings therethrough in preparation for a complete sealing step of the present invention;

FIG. 3 is a perspective view showing the insert mounted on the conforming buck and a spray gun directing polymeric material against the insert to form limited area seal patches thereon;

FIG. 4 is a perspective view of a sealed insert of the present invention;

FIG. 5 is an enlarged fragmentary sectional view taken along the line 5—5 of FIG. 4, looking in the direction of the arrows;

FIG. 6 is an enlarged fragmentary sectional view taken along the line 6—6 of FIG. 4 looking in the direction of the arrows;

DETAILED DESCRIPTION OF THE PREFERRED EMBODIMENT

Figure 1:
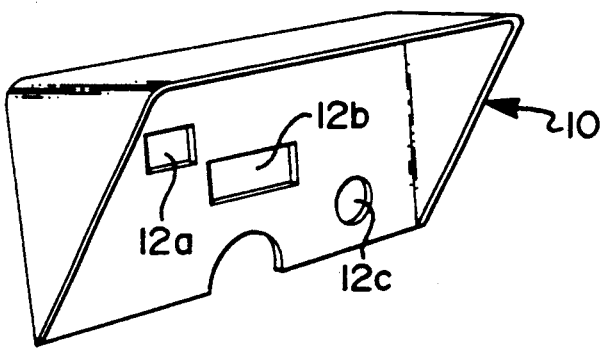
FIG. 1 is a view in perspective of an insert for use with the method of the present invention.
Figure 7:
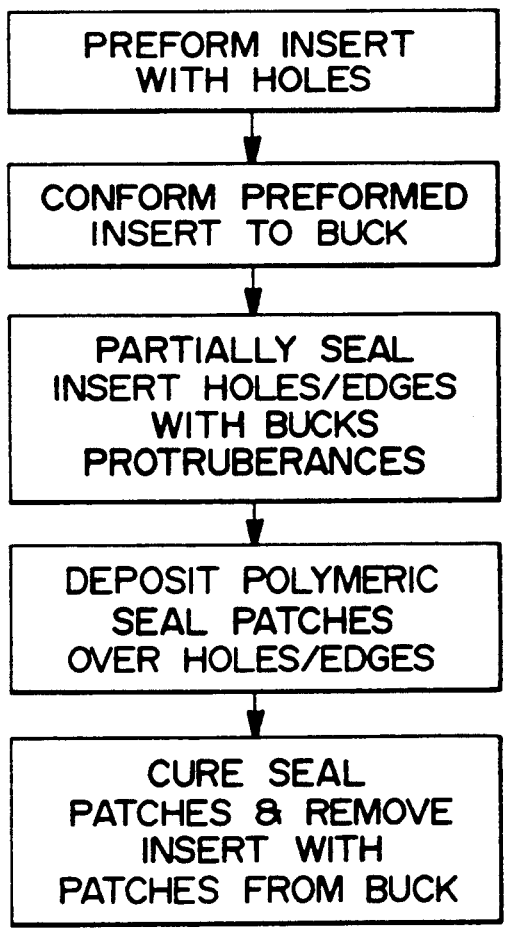
FIG. 7 is a chart showing the steps of the method of the present invention.

FIG. 1 shows an insert member or retainer member 10 suitable for use in supporting an outer plastic shell bonded thereto by an intermediate layer of foam material foamed during a reaction injection molding process. The insert member 10 can, for example, be the support for an instrument panel assembly. The insert member 10 includes openings 12a, 12b, 12c therein of various sizes and locations to accommodate duct systems for air outlets and the like. In the case of armrests or other interior automotive applications, such openings can accommodate switch assemblies or fastener assemblies as the case requires.

In order to use the insert member 10 in a foam molding process, it is necessary to seal the openings 12a-12c so that the foam material will be sealed between the insert and the outer shell component of a foam molded composite plastic article in which the structural insert 10 is located.

According to the present invention, the insert raised formations or member 10 is placed on a conforming buck 14 having protuberances 16a, 16b and 16c of a shape substantially congruent to the openings 12a, 12b, 12c, respectively. The protuberances 16a, 16b and 16c are shaped like the openings and are of slightly lesser dimensions across the perimeters thereof. Furthermore, each of the protuberances 16a, 16b have a height that is substantially the thickness of the structural insert 10 so that when the structural insert 10 is placed on the conforming buck 14, the protuberances 16a-16c will partially seal most of the openings 12a, 12b, 12c.

When the structural insert 10 is supported on the conforming buck 14, the holes 12a-12c are completely sealed by spraying polymeric material through spray guns 21 across the upper end surfaces 20a, 20b, and 20c of the protuberances 16a-16c, respectively, and across a limited peripheral surface portion 22a-22c surrounding each of the openings 12a-12c. A seal patch 24a-24c is formed to cover each of the openings 12a-12c only at the openings. Such seal patches eliminate the need to completely cover the insert member with a film drape as heretofore practiced. Consequently, there is a substantial savings in material costs. Also, there is no need to provide an adhesive between the film and the insert member to prevent separation or delamination of a foam layer from the insert member.

The seal patches 24a-24c are allowed to cure and then the structural insert 10 with imperforate seal patches 24a-24c thereon are removed from the conforming buck to form a sealed member 26 comprising the structural insert 10 and the seal patches 24a-24c. As shown in FIG. 6, protuberance 16c extends completely through and above the surface 18. As such, it forms a concave seal patch 24c. Such a seal patch accommodates pins or other insert features in foam molding apparatus without damage to the seal patch 24c when the insert is loaded into a foam molding apparatus. Examples of foam molding apparatus are shown in U.S. Pat. No. 4,572,856 and 4,734,230.

Figure 8:
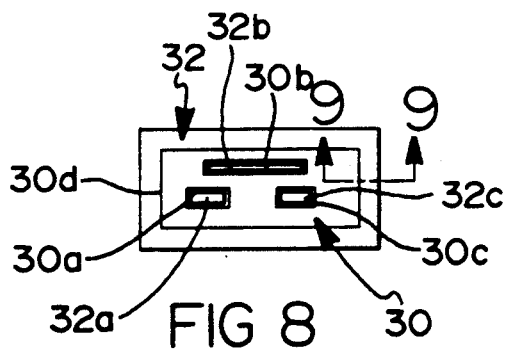
FIG. 8 is an elevational view of another insert with perimeter edges requiring a seal patch.
Figure 9:
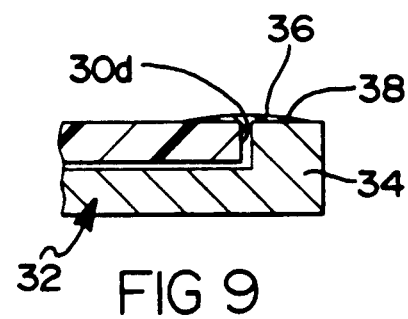
FIG. 9 is an enlarged fragmentary sectional view taken along line 9—9 looking in the direction of the arrows.

FIG. 8 shows an insert 30 with holes 30a-30c and a perimeter edge 30d. The insert is supported on a buck 32 which has hole inserts 32a-32c and a raised perimeter 34 surrounding insert edge 30d. The edge 30d is sprayed to form an edge patch 36 completely around the perimeter of insert 30. Surface 38 of buck 32 is pretreated (along with hole inserts 32a-32c) with a suitable release agent so that the insert 30 and edge patch 36 can be separated from the buck 32 once the seal patches are cured.

Suitable spray polymers for forming the seal patches 24a-24c and edge patch 36 include spray polymer systems such as a polyvinyl chloride particle slurry or a slurry with polypropylene particles or polyethylene particles or other polymer particles with known thermoplastic properties which cause the particles to cure to form an imperforate seal patch. Sprayed material builds up on the upper surfaces 20a-20b of the protuberances 16a-16c and also will cover peripheral portions 22a-22c of the exposed surface 18.

The conforming buck 14 can have a layer 28 of a suitable release agent such as polytetrafluoroethylene (PTFE).

The process of the present invention is illustrated in FIG. 6. It includes preforming an insert 10 with holes 12 therein. Then the preform 10 is conformed to a buck 14. The process then includes partially sealing the insert holes with protuberances on the buck.

Thereafter, the holes are completely sealed by spraying polymeric seal material deposited only at the holes with the buck's protuberances therein to form seal patches 24a-24c.

The process then includes curing the seal patches and removing the insert 10 with the patches thereon from the buck.

The process can be practiced by spraying the polymer sealant material either on the front or the back of the insert so long as it is limited to the hole and the immediate vicinity of the hole.

While the foregoing is a complete description of the preferred embodiment of the present invention, it should be understood that various changes and modifications may be made without departing from the spirit and broad scope of the present invention. The invention is limited only by the scope of the following claims.

What is claimed is:

1. A method for sealing holes and edges of a plastic insert member to prevent escape of foam through the holes or around the edges comprising:

providing a preformed insert member having holes and edges thereon through which and around which foam can escape during a foam molding process in which the insert member is supported in a mold assembly into which foam precursors are directed to form a foam layer against the preformed insert member;

providing an insert member support buck having a plurality of raised formations thereon with end surfaces adapted to extend into the holes and adjacent the edges and of a shape congruent to the holes and edges;

aligning the raised formations with respect to the holes and edges and inserting them into the holes and with respect to the edges to fill the holes and to abut the edges for forming sealing surfaces only at the surface area of the end surfaces and at surface segments on said insert in the immediate vicinity of aid end surfaces;

forming seal patches on the spaced sealing surfaces defined by the raised formations at the ends thereof and on the surface segments of the insert in the immediate vicinity of the end surfaces; and removing said raised formations from said holes and from said edges while separating said insert member from the support buck and retaining the seal patches on the insert member for sealing the holes therethrough and the edges thereon.

2. The method of claim 1, further characterized by:

forming the seal patches by spraying polymeric material only against the end surfaces and adjacent portions of the insert member;

curing the sprayed material to form limited area seal patches bonded to the insert member and thereafter removing the insert member with the seal patches thereon from the support buck to provide an insert plate with sealed holes and sealed edges thereon to prevent the escape of foam therethrough in a subsequent foam molding process in which the insert member is placed in a foam molding cavity into which foam precursors are directed for forming a foam layer against the insert member.

3. The method of claim 2 further characterized by providing the buck with a raised formation thereon directed through and above the exposed surface of the insert member to define a surface for receiving the spray material for forming a seal patch having a concavity therein for use in a foam molding apparatus having inserts accommodated within the seal patch concavity.

4. The method of claim 2, further characterized by the spraying of polymeric material produced by a hot or cold polymeric spray from the group of thermosetting or thermoplastic materials including ABS, nylon, polyvinyl chloride, polypropylene, polyethylene or polyurethane.

* * * * *